May 10, 1927. 1,627,585
M. VOGEL-JORGENSEN
TREATMENT OF CEMENT RAW MATERIALS IN ROTARY KILNS
Filed April 25, 1925
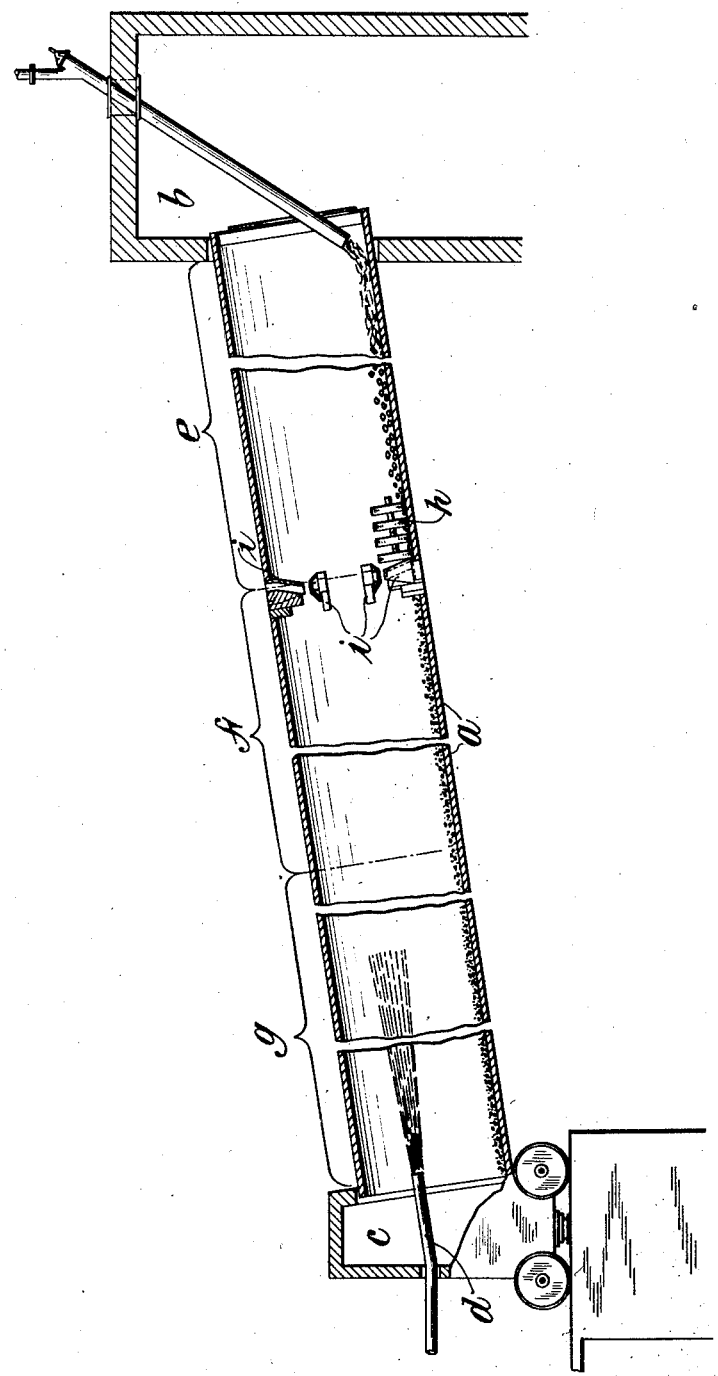

Patented May 10, 1927.

1,627,585

UNITED STATES PATENT OFFICE.

MIKAEL VOGEL-JORGENSEN, OF FREDERIKSBERG, NEAR COPENHAGEN, DENMARK, ASSIGNOR TO F. L. SMIDTH & CO., OF NEW YORK, N. Y., A CORPORATION OF NEW JERSEY.

TREATMENT OF CEMENT RAW MATERIALS IN ROTARY KILNS.

Application filed April 25, 1925, Serial No. 25,724, and in Denmark May 10, 1924.

In the preparation of cement clinker in rotary kilns by the wet process the slurry, delivered to the rotary kiln in a semi-liquid form, is first subjected to a drying action in which the water is driven off from the solid matter. As the drying proceeds the solid mass is broken up into smaller masses of varying size which pass on into the calcining zone of the kiln in which the carbonic acid is to be driven off as far as possible from the nodules or masses of material. The driving off of the carbonic acid from the smaller masses is accomplished effectively, but it frequently happens that the inner portions of the larger masses or nodules are not calcined, even when the temperature in the kiln and therefore the consumption of fuel are increased above that which would be sufficient for the smaller nodules, for the purpose of effecting the calcination of larger masses or nodules. The passage of such imperfectly calcined masses or nodules into the clinkering zone reduces the efficiency of that action and, by the introduction of imperfectly calcined material, impairs the quality of the finished product by reason of the lack of homogeneity. In accordance with the present invention the roughly formed nodules of varying sizes produced in the drying zone are reduced in size at or before they reach the point at which the calcining begins and, by reason of the increase of total surface of the entire mass of nodules, with the reduction in size of the individual nodules of the entire mass, the calcining is facilitated and the separation of carbonic acid is more thoroughly effected. The quality of the finished product is thus improved, by reason of its greater homogeneity and the treatment is carried on at a lower temperature and therefore with less fuel consumption than has been required heretofore to effect calcination of the larger nodules discharged from the drying zone of the kiln. It will be obvious that the invention can be practiced in various ways and different forms of apparatus and in the single figure of the accompanying drawing there is illustrated in longitudinal section and somewhat diagrammatically a rotary kiln adapted for the practice of the invention.

Except as hereinafter indicated the kiln may be of any usual or suitable construction, comprising, in the illustrated embodiment of the invention, a cylindrical shell $a$ provided with a proper lining and suitably supported at the proper inclination, to which the slurry is fed, as indicated at $b$, and from which the clinker or finished product is discharged through a suitable hood, indicated at $c$, with provision, as at $d$, for the introduction of fuel at the discharge end. The water of the semi-liquid slurry is driven off in the drying zone of the kiln, indicated at $e$ and the dried or partly dried mass is broken up in the rotation of the kiln into smaller masses or nodules of varying size. Heretofore such smaller masses or nodules have been permitted to pass on through the calcining zone indicated at $f$ and eventually into the clinkering zone indicated at $g$, with the result as hereinbefore indicated, that the larger of such masses are incompletely calcined in the zone $f$. In accordance with the present invention this difficulty is overcome by reducing in size these first formed nodules before the material reaches the calcining zone or the point at which calcination begins. Such reduction in size might be accomplished in various ways, that is, by various means and either within or without the shell of the kiln, but it can be accomplished satisfactorily by the introduction into the kiln, at the proper point, as at the lower end of the drying zone or the upper end of the calcining zone, suitable crushing devices, which are represented in the drawing as rollers $h$ restrained from longitudinal movement by suitable stops $i$ and performing their function of crushing or reducing in size the nodules which come from the drying zone in the rotation of the kiln in the usual manner.

I claim as my invention:

1. In a continuous process of treating wet cement material, subjecting wet raw material to the action of heat and bodily advancing movement to drive off the moisture therefrom without calcination, mechanically reducing in size the larger nodules so formed, then subjecting the dried material so treated to heat sufficiently high to effect its calcination, and eventually clinkering the calcined material.

2. In a continuous process of treating wet cement material, introducing wet raw material into a rotating kiln, subjecting it to the action of heat and the rotating movement of the kiln to drive off the moisture without calcination and to advance the material bodily, mechanically reducing in size within the kiln, the larger nodules formed by the heat and movement of the material, then subjecting the dried material so treated to heat sufficiently high to effect its calcination, and eventually clinkering the calcined material.

3. In a continuous process of treating wet cement material, introducing wet raw material into a rotating kiln and subjecting it therein to relatively low heat to drive off the moisture therefrom without calcination and while effecting a bodily advancing movement thereof, mechanically reducing in size, within the kiln, nodules formed by the action of the heat and movement of the kiln, and passing the dried material so heated to successive zones of higher heat maintained within the kiln.

This specification signed this 4th day of April, A. D. 1925.

MIKAEL VOGEL-JORGENSEN.